US012061047B2

(12) United States Patent
Yamamoto

(10) Patent No.: US 12,061,047 B2
(45) Date of Patent: Aug. 13, 2024

(54) OPERATION SUPPORT APPARATUS AND OPERATION SUPPORT METHOD FOR HEAT-TREATMENT FURNACE, AND A HEAT-TREATMENT FACILITY AND OPERATION METHOD THEREFOR

(71) Applicant: PRIMETALS TECHNOLOGIES JAPAN, LTD., Hiroshima (JP)

(72) Inventor: Junichi Yamamoto, Hiroshima (JP)

(73) Assignee: PRIMETALS TECHNOLOGIES JAPAN, LTD., Hiroshima (JP)

(*) Notice: Subject to any disclaimer, the term of this patent is extended or adjusted under 35 U.S.C. 154(b) by 980 days.

(21) Appl. No.: 16/981,172

(22) PCT Filed: Mar. 23, 2018

(86) PCT No.: PCT/JP2018/011896
§ 371 (c)(1),
(2) Date: Sep. 15, 2020

(87) PCT Pub. No.: WO2019/180961
PCT Pub. Date: Sep. 26, 2019

(65) Prior Publication Data
US 2021/0018267 A1  Jan. 21, 2021

(51) Int. Cl.
F27B 9/40 (2006.01)
C21D 9/46 (2006.01)
(Continued)

(52) U.S. Cl.
CPC .......... F27B 9/40 (2013.01); C21D 9/46 (2013.01); C21D 11/00 (2013.01);
(Continued)

(58) Field of Classification Search
CPC .. F27B 9/40; C21D 9/46; C21D 11/00; C21D 9/56; F27D 21/0014; G05B 19/188; G05B 2219/49051
See application file for complete search history.

(56) References Cited

U.S. PATENT DOCUMENTS 5,288,526 A * 2/1994 Hogan ............... B05D 3/067
427/508
10,252,467 B2 * 4/2019 Ho ..................... G05B 15/02
(Continued)

FOREIGN PATENT DOCUMENTS

CN  1100146 A  3/1995
CN  1149082 A  5/1997
(Continued)

OTHER PUBLICATIONS

International Preliminary Report on Patentability and English translation of the Written Opinion of the International Searching Authority dated Oct. 8, 2020 for Application No. PCT/JP2018/011896.
(Continued)

Primary Examiner — Thomas C Lee
Assistant Examiner — Tyler Dean Hedrick
(74) Attorney, Agent, or Firm — BIRCH, STEWART, KOLASCH & BIRCH, LLP

(57) ABSTRACT

An operation support apparatus for a heat-treatment furnace for heat-treating a metal plate continuously includes a required time calculation unit configured to calculate, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the (Continued)

heat-treatment furnace corresponding to the target line speed, and a first output unit configured to output the estimated required time calculated by the required time calculation unit.

12 Claims, 10 Drawing Sheets

(51) Int. Cl.
    *C21D 11/00*     (2006.01)
    *F27D 21/00*     (2006.01)
    *G05B 19/18*     (2006.01)

(52) U.S. Cl.
    CPC ....... *F27D 21/0014* (2013.01); *G05B 19/188* (2013.01); *G05B 2219/49051* (2013.01)

(56) References Cited

U.S. PATENT DOCUMENTS

| | | | |
|---|---|---|---|
| 2009/0129802 A1* | 5/2009 | Yasukawa | G03G 15/5012 |
| | | | 399/53 |
| 2010/0319821 A1 | 12/2010 | Gripenberg et al. | |
| 2017/0322545 A1* | 11/2017 | Fischer | G06F 16/283 |
| 2019/0028345 A1* | 1/2019 | Kommula | H04L 41/40 |
| 2020/0064069 A1* | 2/2020 | Taniguchi | F27B 9/12 |
| 2021/0170665 A1* | 6/2021 | Blochmann | B67C 3/22 |
| 2021/0198765 A1* | 7/2021 | Ogasahara | C21D 1/52 |

FOREIGN PATENT DOCUMENTS

| | | |
|---|---|---|
| CN | 101519735 A | 9/2009 |
| CN | 101748289 A | 6/2010 |
| CN | 101928897 A | 12/2010 |
| CN | 102181621 A | 9/2011 |
| CN | 102392119 A | 3/2012 |
| CN | 103764856 A | 4/2014 |
| CN | 108495941 A | 9/2018 |
| CN | 109022757 A | 12/2018 |
| EP | 2 701 121 A1 | 2/2014 |
| JP | 57-35640 A | 6/1982 |
| JP | 61-257428 A | 11/1986 |
| JP | 2-258933 A | 10/1990 |
| JP | 6-49546 A | 2/1994 |
| JP | 2002-105541 A | 4/2002 |
| JP | 2014-148731 A | 8/2014 |
| JP | 2015-1004 A | 1/2015 |
| JP | 6102650 B2 | 3/2017 |
| JP | 6146553 B1 | 6/2017 |

OTHER PUBLICATIONS

International Search Report, issued in PCT/JP2018/011896, PCT/ISA/210, dated Jun. 26, 2018.

* cited by examiner

FIG. 7

Line speed change guidance    Current line speed : 100mpm (1) Input target line speed (minimum: 80mpm, maximum: 150mpm)

70~ [ 120 ] mpm (2) Check, if you apply strip temperature limitation option.

[✓]~72

[ Calculation start ]~74

FIG. 8

Calculation result

|  | Current value | Target value |
|---|---|---|
| Line speed (mpm) | 100 | 120 |
| Furnace temperature (°C) | 700 | 720 |

Estimated required time 15 minutes

Do you change furnace temperature?

Run ~76    Cancel ~78

FIG. 9

Furnace temperature is changing.

Estimated required time: 15 minutes

Elapsed time: 3 minutes 15 seconds

Stop furnace temperature change — 80

OPERATION SUPPORT APPARATUS AND OPERATION SUPPORT METHOD FOR HEAT-TREATMENT FURNACE, AND A HEAT-TREATMENT FACILITY AND OPERATION METHOD THEREFOR

TECHNICAL FIELD

The present disclosure relates to an operation support apparatus and operation support method for a heat-treatment furnace, and a heat-treatment facility and an operation method therefor.

BACKGROUND

In a heat-treatment furnace (for example, an annealing furnace or the like) for heat-treating a metal plate such as a steel plate continuously, a conveyance speed (line speed) of the metal plate may be changed in accordance with a product demand or the like.

When the line speed is changed, the temperature (furnace temperature) of the heat-treatment furnace needs to be changed beforehand to an appropriate temperature according to a line speed to be changed, in order to appropriately heat-treat the metal plate even after the line speed change. This is because if the furnace temperature at the time of the line speed change is much lower or much higher than the appropriate temperature, after the line speed change, the temperature (strip temperature) of the metal plate passing through the heat-treatment furnace falls out of the range of a temperature suitable for heat-treatment, and thus the metal plate is heat-treated adequately or a desired hardness is not obtained, which may result in poor quality, such as durability, of a product.

Therefore, the heat-treatment furnace for the metal plate is designed to avoid a decrease in quality of the metal plate product, which is caused by the line speed change.

For example, Patent Document 1 discloses a strip temperature control method for setting a furnace temperature of an annealing furnace heating zone such that a strip temperature is set to an appropriate value even after a line speed is changed, in an annealing furnace. In this method, first, the range (upper limit and lower limit) of a line speed corresponding to a target strip temperature is calculated based on an error between a calculated value and an actual measured value of a strip temperature on the outlet side of the heating zone relative to a current line speed in the annealing furnace. Then, if an operator sets a target value of the line speed within the above-described range, a furnace temperature is calculated at which an appropriate strip temperature is obtained when a metal sheet is conveyed at a target line speed, and the temperature of the heating zone is set to the calculated furnace temperature.

Since the furnace temperature at the time of the line speed change is thus decided in consideration of the error between the calculated value and the actual measured value of the strip temperature corresponding to the line speed, it is considered that the strip temperature is unlikely to fall out of the appropriate range after the line speed is changed to the target value.

CITATION LIST

Patent Literature

Patent Document 1: JP6102650B

SUMMARY

Technical Problem

Meanwhile, when the furnace temperature is changed before the line speed change in the heat-treatment furnace for the metal plate, a time required to reach a target furnace temperature from the furnace temperature before the change may exceed an allowable value for a metal plate manufacturer, depending on circumstances of an operation time and the like.

In this case, it is desirable to change the line speed from the viewpoint of a product production speed. In reality, however, there may be a case in which an operator should choose not to change the furnace temperature and the line speed.

Thus, in operation of the heat-treatment furnace, if it is possible to support an operator's decision-making of whether to actually change the furnace temperature and the line speed when the line speed is to be changed, it is possible to expect an improvement in operator convenience. In this regard, Patent Document 1 does not describe the way in which the operator determines whether to actually change the furnace temperature and the line speed. In this respect, it is hard to say that the operator convenience is good.

In view of the above, an object of at least one embodiment of the present invention is to provide an operation support apparatus and operation support method for a heat-treatment furnace, and a heat-treatment facility and an operation method therefor, which are capable of improving operator convenience.

Solution to Problem

An operation support apparatus for a heat-treatment furnace according to at least one embodiment of the present invention is an operation support apparatus for a heat-treatment furnace for heat-treating a metal plate continuously, the apparatus including a required time calculation unit configured to calculate, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the heat-treatment furnace corresponding to the target line speed, and a first output unit configured to output the estimated required time calculated by the required time calculation unit.

Advantageous Effects

According to at least one embodiment of the present invention, an operation support apparatus and operation support method for a heat-treatment furnace, and a heat-treatment facility and an operation method therefor, which are capable of improving operator convenience, are provided.

BRIEF DESCRIPTION OF DRAWINGS

FIG. 7 is a view showing an example of a screen display of an operator terminal.

FIG. 8 is a view showing an example of a screen display of the operator terminal.

FIG. 9 is a view showing an example of a screen display of the operator terminal.

DETAILED DESCRIPTION

Figure 1:
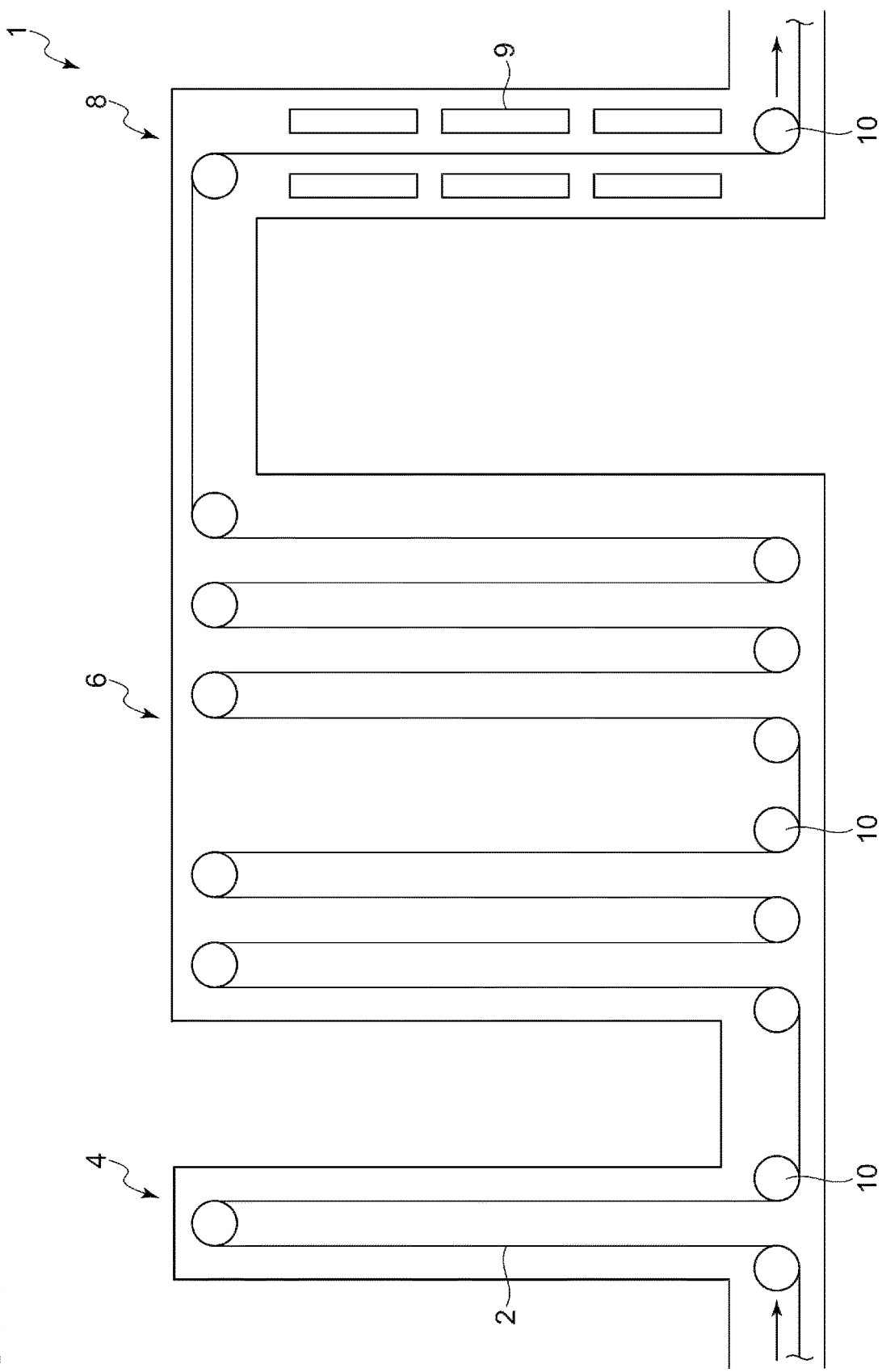
FIG. 1 is a schematic view of a continuous annealing furnace which is a heat-treatment furnace according to an embodiment.

Some embodiments of the present invention will be described below with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present invention.

First, the overview of a heat-treatment furnace, to which an operation support apparatus is applied, according to some embodiments will be described with reference to FIG. 1.

FIG. 1 is a schematic view of a continuous annealing furnace which is a heat-treatment furnace according to an embodiment. As shown in FIG. 1, a continuous annealing furnace 1 is a heat-treatment furnace for continuously annealing a strip-shaped metal plate 2 (for example, a steel plate). The continuous annealing furnace includes a preheating zone 4, a heating zone 6, and a cooling zone 8.

Moreover, the preheating zone 4, the heating zone 6, and the cooling zone 8 are provided with a plurality of conveyance rolls 10. A tension is applied to the metal plate 2 via the conveyance rolls 10, conveying the metal plate 2 at a conveyance speed (line speed) according to the tension.

The preheating zone 4 is disposed upstream of the heating zone 6 and the cooling zone 8 in a conveyance direction of the metal plate 2. The preheating zone 4 is configured to preheat the metal plate 2 before entering the heating zone 6 by a burner or the like (not shown), in order to suppress a variation in temperature of the metal plate 2 at the entrance of the heating zone 6. The heating zone 6 is disposed downstream of the preheating zone 4 and upstream of the cooling zone 8 in the conveyance direction of the metal plate 2. The heating zone 6 is configured to heat the metal plate 2 by a burner or the like (not shown). Moreover, the temperature of the heating zone 6 can be adjusted by, for example, increasing/decreasing the amount of a fuel supplied to the burner. The cooling zone 8 is positioned downstream of the preheating zone 4 and the heating zone 6 in the conveyance direction of the metal plate 2. The cooling zone 8 is configured to slowly cool or rapidly cool the metal plate 2 by jetting a cooling fluid to the surface of the metal plate 2 heated by the heating zone 6, with a cooling means such as a cooling nozzle 9 or the like.

In the continuous annealing furnace 1, the metal plate 2 passes through the above-described preheating zone 4, heating zone 6, and cooling zone 8, thereby annealing the metal plate 2.

The heat-treatment furnace according to the present invention is not limited to the annealing furnace. In some embodiments, the heat-treatment furnace may be a heat-treatment furnace for performing heat treatment other than hardening, tempering, normalizing, and the like.

Figure 3:
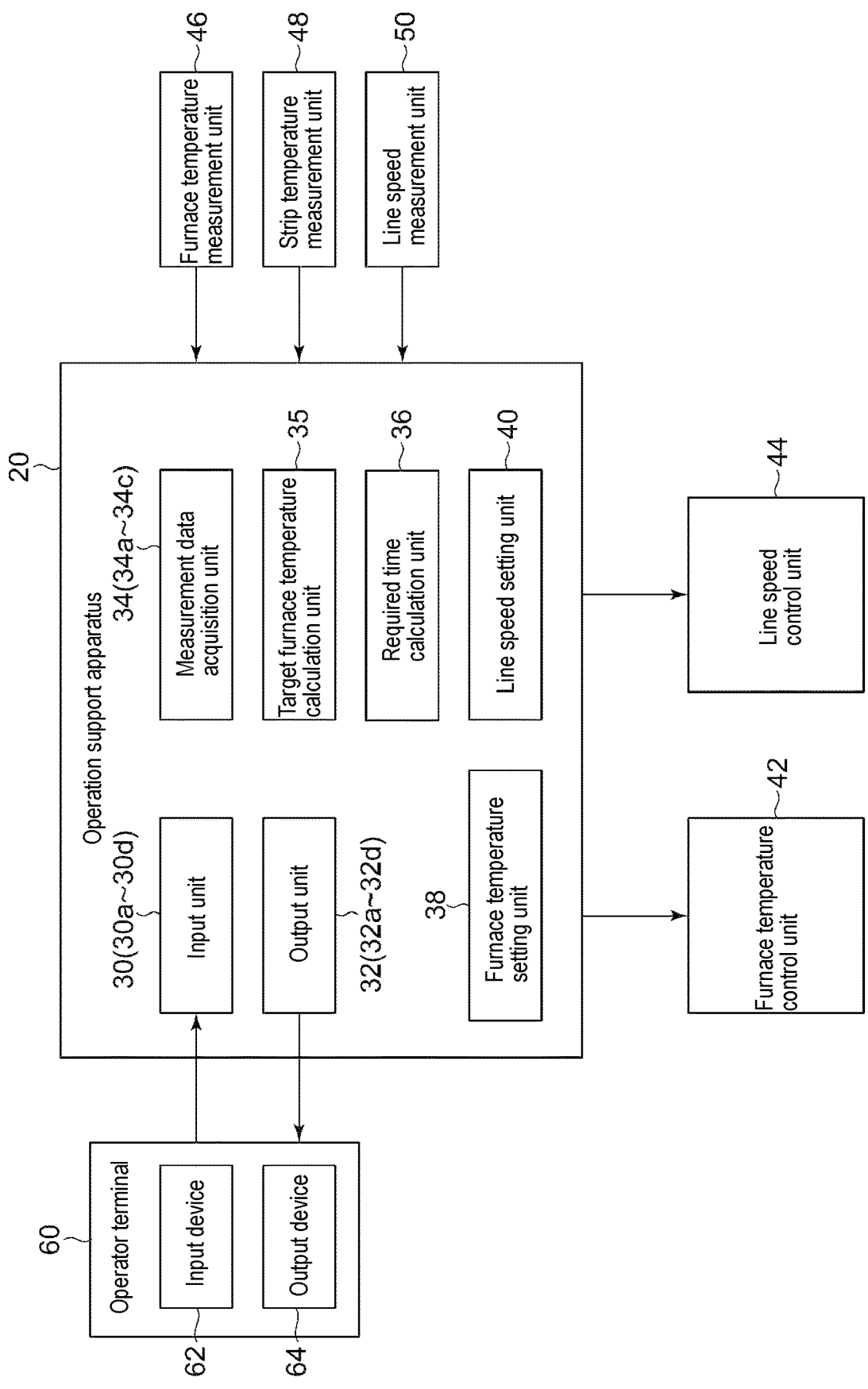
FIG. 3 is a functional block diagram of the operation support apparatus according to an embodiment.

Although not illustrated in particular, the continuous annealing furnace 1 is provided with a furnace temperature measurement unit 46 for measuring the temperature in the continuous annealing furnace 1, a strip temperature measurement unit 48 for measuring the temperature (strip temperature) of the metal plate 2, and a line speed measurement unit 50 for measuring a conveyance speed (line speed) of the metal plate 2 (see FIG. 3).

Next, the configuration of an operation support apparatus 20 according to some embodiments will be described with reference to FIGS. 2 and 3. The operation support apparatus 20 to be described below is an apparatus for supporting the operation of the above-described continuous annealing furnace 1 (heat-treatment furnace).

A heat-treatment facility according to some embodiments includes the above-described continuous annealing furnace 1 (see FIG. 1), and the operation support apparatus 20 (see FIGS. 2 and 3) for supporting the operation of the continuous annealing furnace 1.

Figure 2:
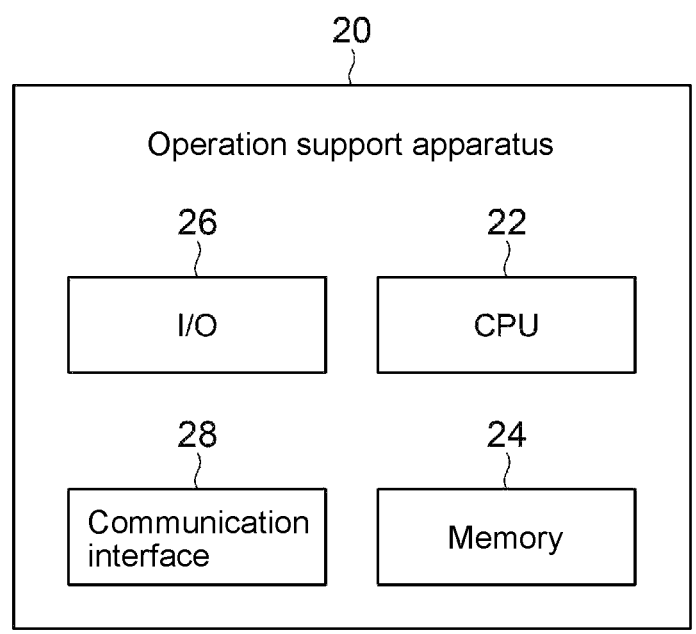
FIG. 2 is a schematic configuration diagram of an operation support apparatus according to an embodiment.

FIG. 2 is a schematic configuration diagram of the operation support apparatus 20 according to an embodiment. FIG. 3 is a functional block diagram of the operation support apparatus 20 according to an embodiment.

As shown in FIG. 2, the operation support apparatus 20 includes a central processing unit (CPU) 22, a memory 24, a I/O interface 26, and a communication interface 28, which are interconnected by a bus (not shown), so as to be communicable with one another via the bus.

The CPU 22 is configured to process information received from various measurement devices (for example, the furnace temperature measurement unit, the strip temperature measurement unit, the line speed measurement unit, and the like to be described later).

The memory 24 is used to store and transfer information and instructions processed by the CPU 22. Moreover, the memory 24 is used to store various types of data received from the above-described measurement devices.

The I/O interface 26 is an interface that enables connection between the operation support apparatus 20 and various external devices including the above-described measurement devices. The I/O interface 26 may have, for example, a function to convert analog signals received from the above-described measurement devices into digital signals that can be processed by the CPU 22.

The communication interface 28 is an interface that enables communication between the operation support apparatus 20 and network, when the operation support apparatus 20 is connected to the network.

As shown in FIG. 3, the operation support apparatus 20 according to an embodiment includes an input unit 30 for receiving an input signal from an external input device 62 (for example, a keyboard, a mouse, a touch pad, or the like), and an output unit 32 for transmitting an output signal to an external output device 64 (for example, a display, a loudspeaker, or the like).

Moreover, the operation support apparatus 20 includes a measurement data acquisition unit 34, a target furnace temperature calculation unit 35, a required time calculation unit 36, a furnace temperature setting unit 38, and a line speed setting unit 40.

The input unit 30 may function as each of a first input unit 30a to a fourth input unit 30d to be described later.

Moreover, the output unit 32 may function as each of a first output unit 32a to a fourth output unit 32d to be described later.

Hereinafter, in the present specification, the first input unit 30a to the fourth input unit 30d may collectively be referred to as the input unit 30. Moreover, the first output unit 32a to the fourth output unit 32d may collectively be referred to as the output unit 32.

The measurement data acquisition unit 34 may be configured to acquire measurement results by the measurement units such as the furnace temperature measurement unit 46, the strip temperature measurement unit 48, the line speed measurement unit 50, and the like provided in the continuous annealing furnace 1. That is, the measurement data acquisition unit 34 may function as each of a furnace temperature acquisition unit 34a, a strip temperature acquisition unit 34b, and a line speed acquisition unit 34c.

The measurement data acquisition unit 34 may be configured to acquire time-series data measured for each predetermined sampling period by the above-described measurement units.

The furnace temperature measurement unit 46 may be configured to measure the temperature of the heating zone 6 mainly heating the metal plate 2, in the continuous annealing furnace 1. Moreover, the strip temperature measurement unit 48 may be configured to measure the temperature of the metal plate 2 in the outlet part of the heating zone 6 in the continuous annealing furnace 1.

The furnace temperature setting unit 38 is configured to transmit a set value of the temperature (furnace temperature) of the continuous annealing furnace 1 (heat-treatment furnace) to a furnace temperature control unit 42.

The furnace temperature control unit 42 may be configured to, for example, adjust the amount of the fuel supplied to the burner of the heating zone 6 in the continuous annealing furnace 1, such that the furnace temperature becomes the temperature set by the furnace temperature setting unit 38.

The line speed setting unit 40 is configured to transmit a set value of the conveyance speed (line speed) of the metal plate 2 in the continuous annealing furnace 1 (heat-treatment furnace) to a line speed control unit 44.

The line speed control unit 44 may be configured to, for example, adjust the tension applied to the metal plate 2 by the conveyance rolls 10 in the continuous annealing furnace 1, such that the line speed becomes the speed set by the line speed setting unit 40.

The furnace temperature control unit 42 and the line speed control unit 44 may be mounted in the same housing as the operation support apparatus 20, or may be mounted in a different housing from the operation support apparatus 20.

Next, a method for supporting the operation of the above-described continuous annealing furnace 1 (heat-treatment furnace) will be described with reference to FIGS. 3 to 10. A method for supporting the operation of the continuous annealing furnace 1 by using the above-described operation support apparatus 20 will be described here.

Figure 4:
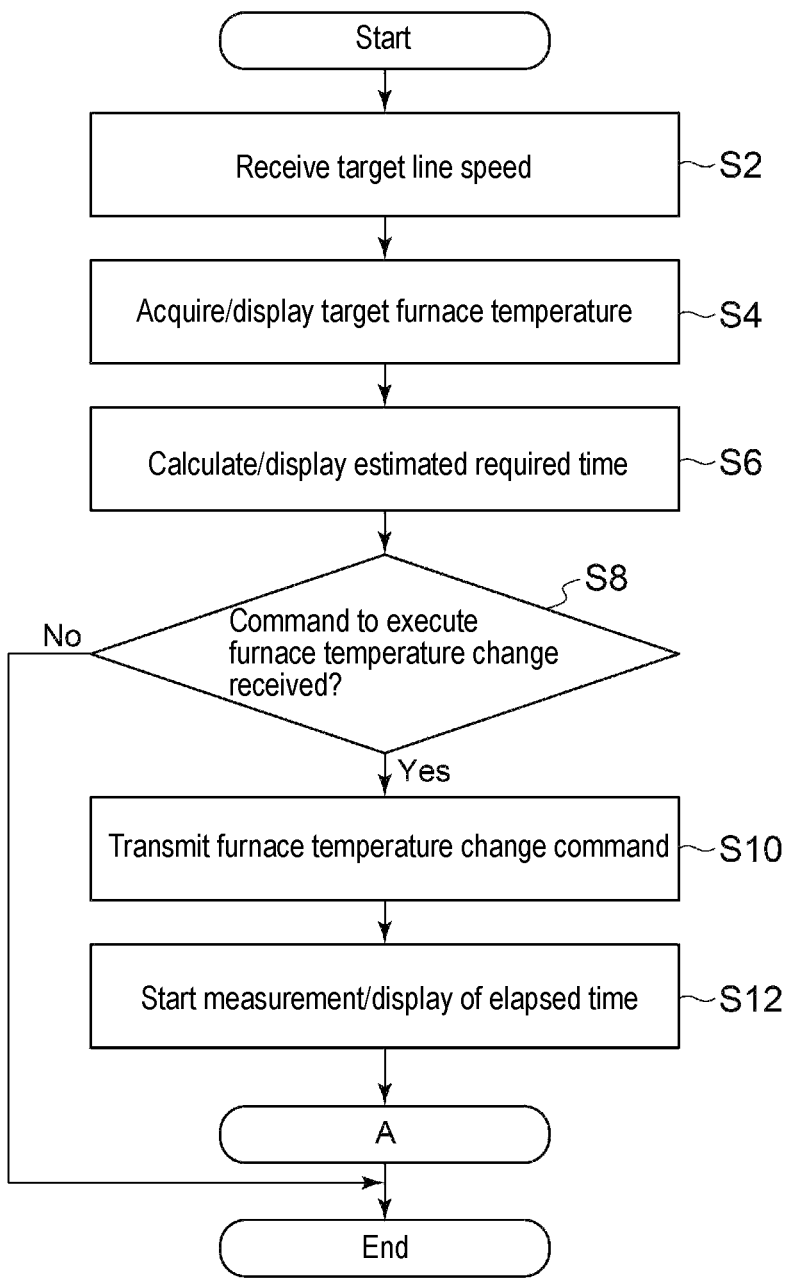
FIG. 4 is a flowchart of an operation support method for the heat-treatment furnace according to an embodiment.
Figure 5:
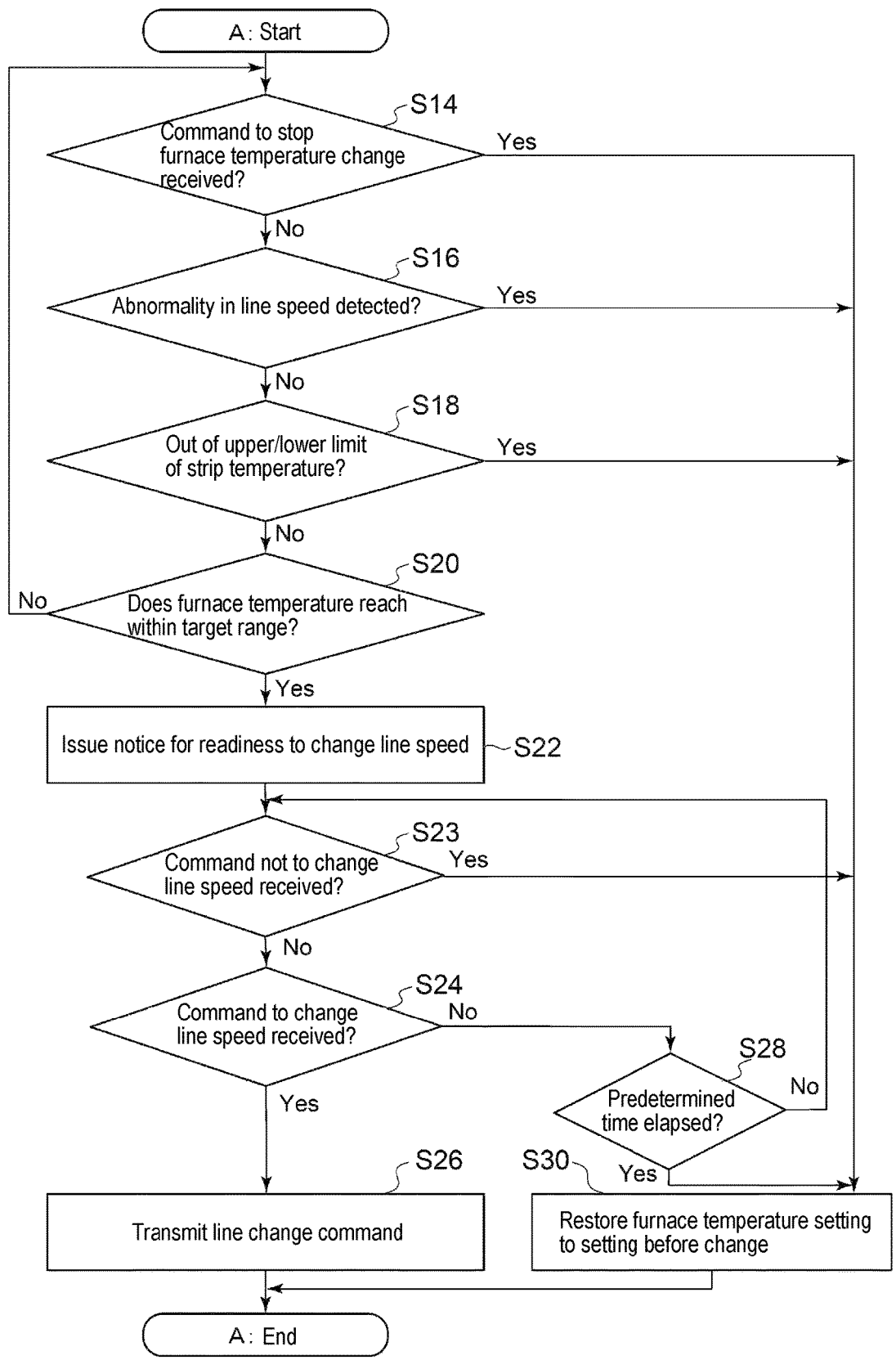
FIG. 5 is a flowchart of a process A in the flowchart shown in FIG. 4.
Figure 6:
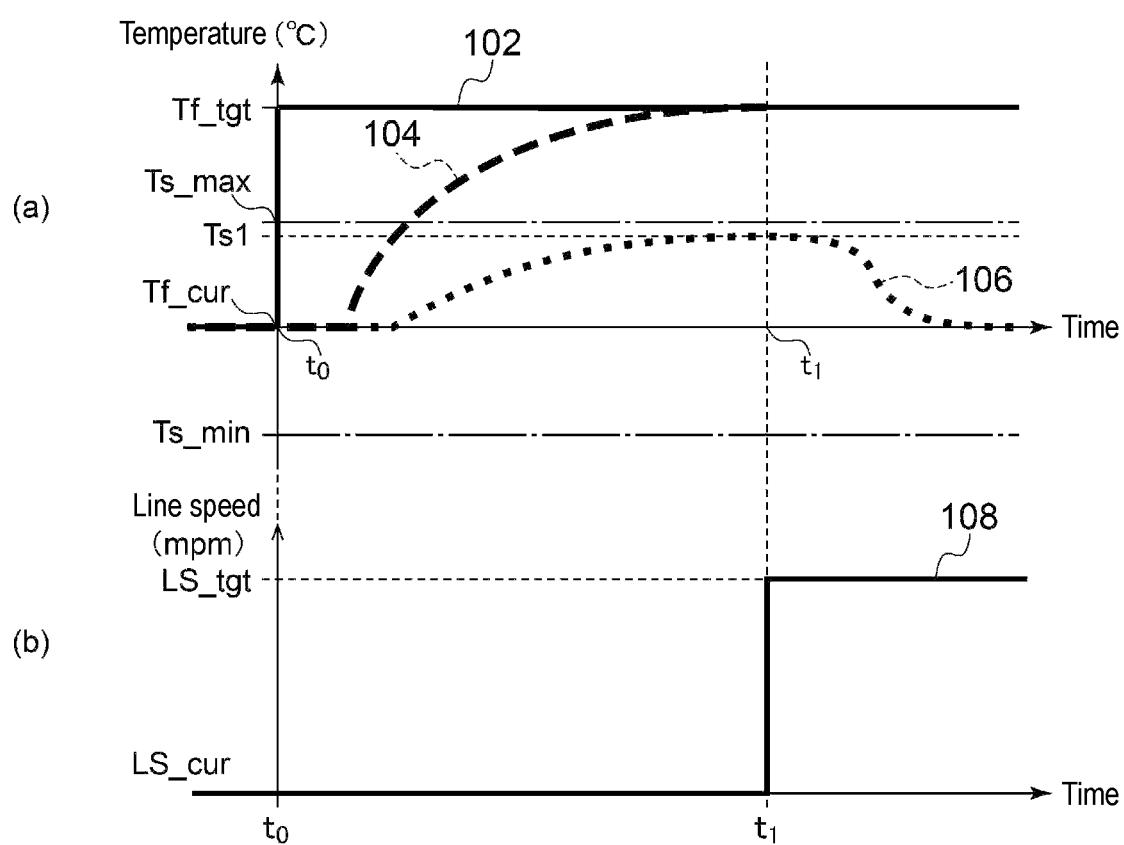
FIG. 6 is a graph for explaining calculation of an estimated required time.

FIG. 4 is a flowchart of the operation support method for the heat-treatment furnace according to an embodiment. FIG. 5 is a flowchart of a process A in the flowchart shown in FIG. 4. FIG. 6 is a graph for explaining calculation of an estimated required time. FIGS. 7 to 10 are views each showing an example of a screen display of the above-described operator terminal.

First, in step S2, the first input unit 30a of the operation support apparatus 20 receives an input of a target line speed set by the operator or the like. The target line speed is a conveyance speed (line speed) to be changed from the current line speed which is a current conveyance speed of the metal plate 2 in the continuous annealing furnace 1.

The target line speed can be decided on a desired value by the operator.

FIG. 7 is the view showing the example of the screen display of an operator terminal 60 at the time of inputting the target line speed. In FIG. 7, in field (1) on the screen, a message to prompt the input of the target line speed is displayed. The operator inputs a desired target line speed (here, 120 mpm) in an input box 70 on the screen, by using the input device 62 (such as the keyboard or mouse) of the operator terminal 60. Subsequently, pressing a calculation start button 74 on the screen, the target line speed input in the input box 70 is transmitted to the first input unit 30a of the operation support apparatus 20.

Pressing the above-described calculation start button 74, calculation in subsequent steps S4 and S6 is started.

The first input unit 30a of the operation support apparatus 20 may be configured to receive the input value by the operator as the target line speed only if the target line speed input by the operator falls within a predetermined range, and to correct the input value of the line speed to a value within the predetermined range and receive the line speed thus corrected as the target line speed if the target line speed input by the operator falls out of the aforementioned predetermined range.

For instance, the example shown in FIG. 7 displays that the changed line speed is restricted to a range of not less than 80 mpm (minimum value) and not greater than 150 mpm (maximum value), in a case where the current line speed is 100 mpm. In this case, if the operator inputs the value of 160 mpm, which exceeds the above-described maximum value, in the input box 70 and presses the calculation start button 74, the first input unit 30a of the operation support apparatus 20 corrects the input value (160 mpm) by the operator to 150 mpm (maximum value) closest to the input value within the above-described range and receives the line speed (150 mpm) thus corrected as the target line speed.

Since the first input unit 30a thus receives the target line speed restricted within an appropriate range, it is possible to prevent a rapid line speed change, and to suppress a decrease in quality of a metal plate product caused by the rapid line speed change.

In step S4, a target furnace temperature is acquired based on the target line speed acquired in step S2. The target furnace temperature is a temperature of the continuous annealing furnace 1 (heat-treatment furnace) corresponding to the target line speed, that is, a furnace temperature at which annealing (heat treatment) of the metal plate 2 can be performed appropriately if the metal plate 2 is conveyed at the target line speed.

The temperature (furnace temperature) of the continuous annealing furnace 1 may be the temperature of the heating zone 6, in particular. Since the heating treatment of the metal plate 2 in the continuous annealing furnace 1 is mostly performed in the heating zone 6, it is possible to anneal the metal plate 2 more appropriately by appropriately setting the target temperature of the heating zone 6 as the target furnace temperature.

Thus, a description will be given below, on a premise that the "furnace temperature", the "current furnace temperature", and the "target furnace temperature" are the current furnace temperature and the target furnace temperature of the heating zone 6, respectively.

The target furnace temperature may be calculated by the target furnace temperature calculation unit 35. In this case, the target furnace temperature calculation unit 35 may calculate the target furnace temperature corresponding to the target line speed acquired in step S2, based on a multiple regression model indicating the furnace temperature of the heating zone 6, the temperature of the metal plate 2 on an outlet side of the heating zone 6, the line speed, and the relationship between the thickness and width of the metal plate 2.

Alternatively, a table indicating the furnace temperature of the heating zone 6, the temperature of the metal plate 2 on the outlet side of the heating zone 6, the line speed, and the correlation between the thickness and width of the metal plate 2 may be acquired in advance, and the table may be stored in a storage device such as the memory 24 of the operation support apparatus 20. Then, the operation support apparatus 20 may acquire, from the above-described table, the target furnace temperature corresponding to the target line speed acquired in step S2.

The target furnace temperature thus calculated or acquired may be output to the output device 64 of the operator terminal 60 via the output unit 32.

In step S6, the required time calculation unit 36 calculates an estimated required time for the temperature of the heating zone 6 to reach the target furnace temperature from the current furnace temperature, based on the current line speed, the current furnace temperature of the heating zone 6, the target line speed acquired in step S2, and the target furnace temperature acquired in step S4.

The current furnace temperature is the current temperature of the heating zone 6, and may be acquired by the furnace temperature acquisition unit 34a (measurement data acquisition unit 34).

Moreover, the current line speed is the current conveyance speed of the metal plate 2, and may be acquired by the line speed acquisition unit 34c (measurement data acquisition unit 34).

A procedure of calculating the estimated required time will briefly be described here, with reference to FIG. 6.

In each of (a) and (b) of FIG. 6, the abscissa indicates a time, and the ordinate indicates the temperature and the line speed. Moreover, (a) and (b) of FIG. 6 show respective graphs of a set value 102 of the furnace temperature, a calculated value 104 of the furnace temperature, a calculated value 106 of the strip temperature, and a set value 108 of the line speed.

Moreover, it is premised that the conveyance speed of the metal plate 2 is changed stepwise from a current line speed LS_cur to a target line speed LS_tgt, and the furnace temperature is changed stepwise from a current furnace temperature Tf_cur to a target furnace temperature Tf_tgt.

Moreover, the target line speed LS_tgt is a desired value, and the target furnace temperature Tf_tgt is a value acquired by, for example, the procedure of step S4 described above based on the target line speed LS_tgt.

First, the furnace temperature set value 102 is changed stepwise from the current furnace temperature Tf_cur to the target furnace temperature Tf_tgt at time t0. This simulates that the furnace temperature change is started at the time t0.

If the set value of the furnace temperature is thus increased stepwise, the actual furnace temperature (calculated value) 104 starts to follow a little late. The change of the actual furnace temperature (calculated value) 104 is thus late compared to the set value 102 of the furnace temperature, because the volume and radiation heat of the heat-treatment furnace are considered.

Then, as time advances, the actual furnace temperature (calculated value) 104 matches the set value 102 of the furnace temperature, that is, the target furnace temperature Tf_tgt, or a difference between the actual furnace temperature (calculated value) 104 and the set value 102 of the furnace temperature (target furnace temperature Tf_tgt) falls within the predetermined range. Setting this time as t1, the length of a period from t0 to t1 is calculated as the estimated required time.

The estimated required time calculated by the required time calculation unit 36 as described above is output to the screen (output device 64) of the operator terminal 60 via the first output unit 32a.

FIG. 8 is a view showing a screen display of the operator terminal 60 after the calculation based on the target line speed acquired in step S2 is performed (that is, after the calculation start button 74 in FIG. 7 is pressed). Referring to the screen of FIG. 8, it can be seen that the furnace temperature of the heating zone 6 corresponding to the target line speed (120 mpm) set in step S2 is calculated at 720° C. in step S4 described above, and the estimated required time for the furnace temperature of the heating zone 6 to increase from the current value of 700° C. to the target value of 720° C. is calculated at 15 minutes in step S6 described above.

In step S8, the second input unit 30b receives a command of whether to execute the furnace temperature change from the current furnace temperature to the target furnace temperature.

For example, the screen (output device 64) of the operator terminal 60 shown in FIG. 8 displays a calculation result of the estimated required time calculated in step S6, and displays a run button 76 and a cancel button 78.

If the run button 76 is pressed, a command to execute the furnace temperature change from the current furnace temperature to the target furnace temperature is transmitted from the operator terminal 60 to the second input unit 30b of the operation support apparatus 20. Then, if the second input unit 30b receives the above-described command (Yes in S8 of FIG. 4), the process advances to subsequent step S10.

In step S10, the furnace temperature setting unit 38 transmits, to the furnace temperature control unit 42, a furnace temperature change command to change the temperature of the heating zone 6 from the current furnace temperature to the target furnace temperature.

That is, the furnace temperature setting unit 38 sets the temperature of the heating zone 6 to the target furnace temperature, and based on the furnace temperature set by the furnace temperature setting unit 38, the furnace temperature control unit 42 adjusts the amount of the fuel or oxidant supplied to the burner of the heating zone 6 such that the temperature of the heating zone 6 becomes the target temperature. The change (increase or decrease) in temperature of the heating zone 6 is thus started.

Alternatively, if the cancel button 78 is pressed on the screen of the operator terminal 60 shown in FIG. 8, a command not to execute the furnace temperature change from the current furnace temperature to the target furnace temperature is transmitted to the second input unit 30b. Then, if the second input unit 30b receives the above-described command (No in S8 of FIG. 4), the furnace temperature change after step S10 is not executed, terminating a series of processes.

As described above, in the operation support apparatus and the operation support method according to the above-described embodiments, the estimated required time for the temperature of the heating zone 6 (heat-treatment furnace) to reach, from the current furnace temperature, the target furnace temperature corresponding to the target line speed to be changed is calculated and output to the screen of the operator terminal 60 via the first output unit 32a, when the conveyance speed (line speed) of the metal plate 2 is to be changed in the continuous annealing furnace 1 (heat-treatment furnace). Therefore, based on the estimated required time thus output, the operator can determine whether to actually change the furnace temperature and the line speed.

Thus, for example, even if there is a request to change the line speed, the operator may be able to determine not to change the furnace temperature and the line speed, in view of other circumstances (such as an operating hour and the like of the heat-treatment furnace), in a case where the outputted estimated required time exceeds an allowable range.

Thus, according to the above-described embodiments, since the operator can determine, based on the outputted estimated required time, whether to actually change the furnace temperature and the line speed, it is possible to improve operator convenience.

In some embodiments, calculation of the estimated required time (step S6) may be performed to be described below. That is, first, the strip temperature of the metal plate 2 at the target furnace temperature acquired in step S4 is calculated. Next, the target line speed is corrected such that the strip temperature falls within the predetermined range. Then, a time that elapses until the temperature of the heat-treatment furnace reaches, from the current furnace temperature, the corrected target furnace temperature corresponding to the corrected target line speed is calculated as the estimated required time.

Referring back to FIG. 6, the overview of the correction of the target line speed and the correction of the target furnace temperature will be described here.

As described already, the estimated required time (the period from t0 to t1 in FIG. 6) can be calculated based on the current line speed LS_cur, the target line speed LS_tgt, the current furnace temperature Tf_cur, and the target furnace temperature Tf_tgt.

A strip temperature Ts1 of the metal plate 2 corresponding to the target furnace temperature Tf_tgt is calculated here. If the strip temperature Ts1 falls within a predetermined range of not less than a lower limit (Ts_min) and not greater than an upper limit (Ts_max) as shown in FIG. 6, for example, the metal plate 2 can be heat-treated appropriately. Thus, the target line speed and the target furnace temperature need not be corrected.

On the other hand, if the strip temperature Ts falls out of the above-described predetermined range (that is, less than the lower limit or more than the upper limit), the metal plate 2 cannot be heat-treated appropriately. Thus, the target line speed and the target furnace temperature need to be corrected.

For example, if the value of the calculated strip temperature Ts1 of the metal plate 2 exceeds the predetermined upper limit (Ts_max), the target line speed LS_tgt is decreased (that is, to correct) to acquire a corrected target furnace temperature Tf_tgt* (not shown) corresponding to a corrected target line speed LS_tgt* (not shown) obtained by correcting the target line speed LS_tgt. Then, the strip temperature of the metal plate 2 corresponding to the corrected target furnace temperature Tf_tgt* is calculated to check whether the calculated value falls within the above-described predetermined range (not less than Ts_min and not greater than Ts_max).

Such calculation is repeated until the calculated value of the strip temperature falls within the above-described predetermined range, making it possible to acquire the proper target line speed and target furnace temperature. In addition, based on the acquired proper target line speed and target furnace temperature, it is possible to calculate the estimated required time.

In the case of the above-described embodiments, since, based on the calculation result of the strip temperature at the target furnace temperature, the target line speed is corrected such that the strip temperature falls within the predetermined range, and the time until the temperature of the heating zone 6 (heat-treatment furnace) reaches the corrected target furnace temperature corresponding to the corrected target line speed is calculated as the estimated required time, the strip temperature after the start of the furnace temperature change easily falls within the predetermined range. Thus, it is possible to heat-treat the metal plate 2 at an appropriate temperature within the predetermined range, even if the furnace temperature and the line speed are changed, facilitating maintenance of quality of the metal plate product.

In step S12, a time is measured that elapses from when the furnace temperature change command to change the temperature of the heating zone 6 from the current furnace temperature to the target furnace temperature is transmitted from the furnace temperature setting unit 38 to the furnace temperature control unit 42 in step S10, and the elapsed time is output from the output unit 32 to be displayed on the screen of the operator terminal 60.

FIG. 9 is a view showing a screen display of the operator terminal 60 after the above-described furnace temperature change command is transmitted to the furnace temperature control unit 42 in step S10 (that is, after the run button 76 in FIG. 8 is pressed). Referring to the screen of FIG. 9, the elapsed time measured in step S12 is displayed, together with a message that the furnace temperature is changing and an estimated elapsed time.

Since the time that elapses from when the furnace temperature change command is transmitted is thus measured and displayed, it is possible to make good use of information regarding the elapsed time, for example, it is possible to make a determination of stopping the furnace temperature change, based on the elapsed time, to be described later.

Steps S14 to S30 following step S12 are included in the process A (see FIG. 4), and the contents of these steps are shown in the flowchart of FIG. 5.

After the furnace temperature change command is transmitted to the furnace temperature control unit 42 in step S10, if a difference between the temperature of the heating zone 6 and the target furnace temperature falls within the predetermined range (Yes in step S20) without stopping the furnace temperature change (No in steps S4 to S18; steps S14 to S18 will be described later), a notice of readiness to change the conveyance speed (line speed) of the metal plate 2 to the target line speed is output via the second output unit 32b (step S22).

Figure 10:
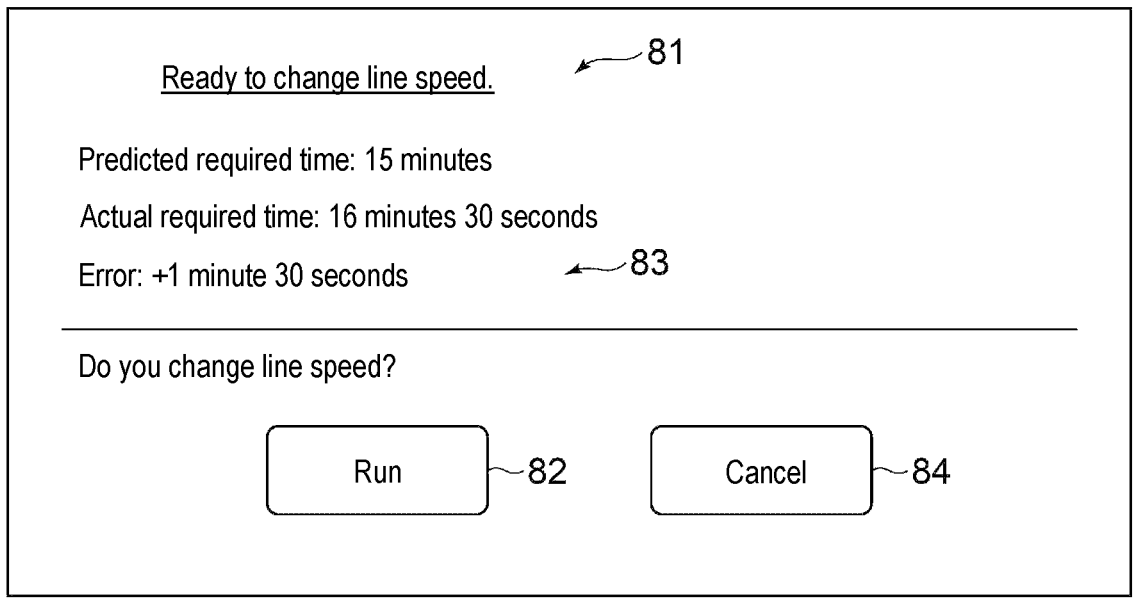
FIG. 10 is a view showing an example of a screen display of the operator terminal.

FIG. 10 is a view showing a screen display of the operator terminal 60 when the difference between the temperature of the heating zone 6 and the target furnace temperature falls within the predetermined range in step S20. As shown in FIG. 10, at this time, the screen of the operator terminal 60 displays a notice 81 of readiness to change to the target line speed. This notice is output to the operator terminal 60 via the second output unit 32*b* of the operation support apparatus 20.

The operation support apparatus 20 may include a third output unit 32*c* for outputting an error between the estimated required time and an actual required time, which is a time from the time when the furnace temperature change command is transmitted (the time of step S10) to the time when the difference between the target furnace temperature and the actual temperature of the heating zone 6 falls in the predetermined range (the time when Yes in step S20).

The screen of the operator terminal 60 shown in FIG. 10 displays the above-described estimated required time, the actual required time, and the error between them (see reference numeral 83), together with the notice 81 of readiness to change the line speed. This error 83 is output to the operator terminal 60 via the above-described third output unit 32*c*.

Since the above-described error between the estimated required time and the actual required time is thus output to the operator terminal 60 or the like, the operator can grasp the situation of the continuous annealing furnace 1 (heat-treatment furnace) including the heating zone 6, from the output result regarding the error. Thus, it is possible to improve operator convenience.

Data regarding the above-described error between the estimated required time and the actual required time may be acquired each time a series of processes according to the embodiment is performed, and the data thus acquired may be accumulated in a data accumulation unit or the like, in the continuous annealing furnace 1. The accumulated data regarding the error may be used to analyze the cause of the error or may be used to correct the error automatically.

When the notice of readiness to change the line speed is output in step S22, in step S24, the fourth input unit 30*d* receives a command of whether to execute the line speed change from the current line speed to the target line speed, except for a case exceeding a predetermined time limit in step S23 (No in step S23; step S23 will be described later).

For example, the screen of the operator terminal 60 shown in FIG. 10 displays a run button 82 and a cancel button 84, together with the notice 81 of readiness to change the line speed in step S22.

If the run button 82 shown in FIG. 10 is pressed, a command to change the line speed from the current line speed to the target line speed is transmitted from the operator terminal 60 to the fourth input unit 30*d* of the operation support apparatus 20. Then, if the fourth input unit 30*d* receives the above-described command (No in S23 and Yes in S24 of FIG. 5), the process advances to subsequent step S26.

In step S26, the line speed setting unit 40 transmits, to the line speed control unit 44, a line speed change command to change the line speed in the continuous annealing furnace 1 from the current line speed to the target line speed.

That is, the line speed setting unit 40 sets the conveyance speed of the metal plate 2 in the continuous annealing furnace 1 to the target line speed, and based on the setting of the line speed by the line speed setting unit 40, the line speed control unit 44, for example, adjusts the tension applied to the metal plate 2 by the conveyance rolls 10 for conveying the metal plate 2 such that the line speed becomes the target line speed. The change (increase or decrease) in line speed is thus started.

Alternatively, if the cancel button 84 is pressed on the screen of the operator terminal 60 shown in FIG. 10, a command not to change the line speed from the current line speed to the target line speed is transmitted from the operator terminal 60 to the fourth input unit 30*d* of the operation support apparatus 20. Then, if the fourth input unit 30*d* receives the above-described command (Yes in S23 of FIG. 5), the furnace temperature of the heating zone 6 is restored to the current furnace temperature before the furnace temperature change (that is, the furnace temperature at the time of steps S2 to S8 in FIG. 4) (step S30), terminating a series of processes.

If the line speed is not changed from the current line speed to the target line speed (for example, No in step S23 and No in step S24, and Yes in step S28) within the predetermined time limit after the notice of readiness to change the line speed is output in step S22, the furnace temperature of the heating zone 6 is restored to the current furnace temperature before the furnace temperature change (that is, the furnace temperature at the time of steps S2 to S8 in FIG. 4), terminating a series of processes.

The predetermined time limit may be decided in correspondence with at least one of the estimated required time, the target furnace temperature, or the current line speed described above, and may be, for example, a time obtained by adding a predetermined length of time to the estimated required time.

As described above, the temperature of the heating zone 6 is restored to the temperature before the furnace temperature change, if the line speed is not changed within the predetermined time limit, after the notice of readiness to change the line speed is output. Thus, it is possible to protect the components for the continuous annealing furnace 1 (heat-treatment furnace) from a high temperature, for example.

A determination of whether the predetermined time limit is exceeded, after the notice of readiness to change the line speed is output, may be made by using the elapsed time from the start of the furnace temperature change, the measurement of which is started in step S12.

Moreover, a determination of whether the speed line speed is changed from the current line speed to the target line speed may be made based on the time-series data on the conveyance speed of the metal plate 2, which is acquired by the line speed acquisition unit 34*c*.

As described already a little, after the furnace temperature change command is transmitted to the furnace temperature control unit 42 in step S10, the furnace temperature change that has already been started may be stopped, depending on the determination results in steps S14 to S18. These cases will be described.

Even if the furnace temperature change command is transmitted in step S10, and the furnace temperature change is started, in a case in which the third input unit 30*c* receives a command to stop the furnace temperature change (Yes in step S4), the furnace temperature of the heating zone 6 is restored to the current furnace temperature before the furnace temperature change (that is, the furnace temperature at the time of steps S2 to S8 in FIG. 4) (step S30; that is, the furnace temperature set by the furnace temperature setting unit 38 is changed from the target furnace temperature to the current furnace temperature), terminating a series of processes.

For example, the screen of the operator terminal 60 shown in FIG. 9 displays a message that the furnace temperature is changing, as well as a furnace temperature change stop button 80. If the furnace temperature change stop button 80 is pressed, a command to stop the furnace temperature change is transmitted from the operator terminal 60 to the third input unit 30c of the operation support apparatus 20. Then, if the third input unit 30c receives this command, the furnace temperature setting unit 38 sets the set temperature of the heating zone 6 to the current temperature before the furnace temperature change and transmits this set temperature to the furnace temperature control unit 42.

Since the third input unit 30c thus receives the command to stop the furnace temperature change input by the operator via the operator terminal 60, it is possible to flexibly stop the temperature change of the heating zone 6. Thus, the furnace temperature change is stopped easily based on the determination of the operator, making it possible to improve operator convenience.

Moreover, even if the furnace temperature change command is transmitted in step S10, and the furnace temperature change is started, in a case in which it is detected that the conveyance speed of the metal plate 2 is changed to a conveyance speed which is different from the target line speed (Yes in step S16) or in a case in which it is detected that the temperature (strip temperature) of the metal plate 2 falls out of the predetermined range (Yes in step S18), the furnace temperature of the heating zone 6 is restored to the current furnace temperature before the furnace temperature change (that is, the furnace temperature at the time of steps S2 to S8 in FIG. 4)(step S30; that is, the furnace temperature set by the furnace temperature setting unit 38 is changed from the target furnace temperature to the current furnace temperature), terminating a series of processes.

In the above-described embodiment, since the temperature change of the continuous annealing furnace 1 is stopped when an abnormality, such as the line speed or the strip temperature becomes a value out of the predetermined range, is detected in the continuous annealing furnace 1, it is possible to suppress a failure of the components for the continuous annealing furnace 1 caused by an abnormal event, for example.

If the furnace temperature set by the furnace temperature setting unit 38 is changed from the target furnace temperature to the current furnace temperature in step S30, a notice that execution of the furnace temperature change is stopped may be output to, for example, the operator terminal 60.

Moreover, the operation support apparatus 20 may include the fourth output unit 32d configured to output the above-described notice that execution of the furnace temperature change is stopped.

Since, when the temperature change of the continuous annealing furnace 1 is stopped, the notice of this is output to the operator terminal 60 or the like via the fourth output unit 32d, the operator can appropriately know that the furnace temperature change is stopped. Thus, it is possible to improve operator convenience.

The overview of an operation support apparatus and operation support method for a heat-treatment furnace, and a heat-treatment facility and an operation method therefor according to some embodiments will be described below.

(1) An operation support apparatus for a heat-treatment furnace according to at least one embodiment of the present invention is an operation support apparatus for a heat-treatment furnace for heat-treating a metal plate continuously, the apparatus including a required time calculation unit configured to calculate, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the heat-treatment furnace corresponding to the target line speed, and a first output unit configured to output the estimated required time calculated by the required time calculation unit.

In the above configuration (1), since the estimated required time for the temperature of the heat-treatment furnace to reach, from the current furnace temperature, the target furnace temperature corresponding to the target line speed to be changed is calculated and output to an output device (such as a display or a loudspeaker), when the conveyance speed (line speed) of the metal plate is to be changed in the heat-treatment furnace, the operator can determine, based on the output result (estimated required time), whether the changes of the furnace temperature and the line speed are necessary.

Thus, for example, even if there is a request to change the line speed, the operator may be able to determine not to change the furnace temperature and the line speed, in view of other circumstances (such as an operating hour and the like of the heat-treatment furnace), in a case where the estimated required time, which is the above-described output result, exceeds an allowable range.

Thus, with the above configuration (1), since the operator can determine, based on the outputted estimated required time, whether to actually change the furnace temperature and the line speed, it is possible to improve operator convenience.

(2) In some embodiments, in the above configuration (1), the operation support apparatus further includes a first input unit for receiving an input of the target line speed.

With the above configuration (2), since the target line speed set by the operator via an input device (such as a keyboard or a mouse) is received via the first input unit, it is possible to calculate the above-described estimated required time based on the target line speed thus received. Thus, it is possible to further improve operator convenience.

(3) In some embodiments, in the above configuration (1) or (2), the operation support apparatus further includes a second input unit for receiving a command of whether to execute a furnace temperature change from the current furnace temperature to the target furnace temperature, and a furnace temperature setting unit configured to transmit, to a furnace temperature control unit for controlling the temperature of the heat-treatment furnace, a furnace temperature change command to change the temperature of the heat-treatment furnace to the target furnace temperature, when the second input unit receives the command to execute the furnace temperature change.

With the above configuration (3), since the above-described second input unit and furnace temperature setting unit are provided, it is possible to receive, by the second input unit, the command related to the necessity of execution of the furnace temperature change input by the operator with the input device and it is possible to transmit the furnace temperature change command according to the operator's request from the furnace temperature setting unit to the furnace temperature control unit, for example. Thus, it is possible to appropriately transmit the command to change the furnace temperature from the operator to the furnace temperature control unit, and to appropriately change the temperature of the heat-treatment furnace.

(4) In some embodiments, in the above configuration (3), the operation support apparatus further includes a second output unit configured to output a notice of readiness to change the conveyance speed of the metal plate to the target line speed, when a difference between the temperature of the heat-treatment furnace and the target furnace temperature falls within a predetermined range, after the furnace temperature setting unit transmits the furnace temperature change command to the furnace temperature control unit.

With the above configuration (4), since the notice of readiness to change the line speed is output to the output device or the like via the second output unit, the operator can transmit the command to actually change the line speed to a line speed control apparatus, in consideration of the output result by the second output unit. Thus, it is possible to further improve operator convenience.

(5) In some embodiments, in the above configuration (4), the operation support apparatus further includes a third output unit configured to output an error between the estimated required time and a time from when the furnace temperature change command is transmitted until when the difference between the temperature of the heat-treatment furnace and the target furnace temperature falls in the predetermined range.

With the above configuration (5), since the error between the estimated required time and a time actually taken to change the temperature (furnace temperature) of the heat-treatment furnace is output to the output device or the like via the third output unit, the operator can grasp the situation of the heat-treatment furnace from the output result regarding the error. Thus, it is possible to further improve operator convenience.

(6) In some embodiments, in the above configuration (4) or (5), the furnace temperature setting unit is configured to restore the temperature of the heat-treatment furnace to the current furnace temperature before the furnace temperature change, if a change from the current line speed to the target line speed is not executed within a predetermined time limit, after the notice of readiness to change the conveyance speed is output.

With the above configuration (6), since the temperature of the heat-treatment furnace is restored to the temperature before the furnace temperature change, if the line speed is not changed within the predetermined time limit after the furnace temperature change is started, it is possible to protect the components for the heat-treatment furnace from a high temperature, for example.

(7) In some embodiments, in the above configuration (6), the operation support apparatus further includes a line speed acquisition unit for acquiring time-series data of the conveyance speed of the metal plate. The furnace temperature setting unit is configured to determine, based on the time-series data of the conveyance speed, presence or absence of the change from the current line speed to the target line speed.

With the above configuration (7), it is possible to appropriately determine the presence or absence of the change of the line speed, based on the time-series data of the line speed acquired by the line speed acquisition unit.

(8) In some embodiments, in any one of the above configurations (3) to (7), the operation support apparatus further includes a third input unit for receiving a command to stop executing the furnace temperature change. The furnace temperature setting unit is configured to restore the temperature of the heat-treatment furnace to the current furnace temperature, when the third input unit receives the command to stop, after the second input unit receives the command to execute the furnace temperature change.

With the above configuration (8), since the command to stop the furnace temperature change is received via the third input unit, it is possible to stop the temperature change of the heat-treatment furnace by receiving, with the third input unit, the stop command input by the operator via the input device, for example. Thus, it is possible to stop the furnace temperature change based on the determination of the operator, making it possible to further improve operator convenience.

(9) In some embodiments, in anyone of the above configurations (3) to (8), the furnace temperature setting unit is configured to restore the temperature of the heat-treatment furnace to the current furnace temperature, if it is detected that the conveyance speed of the metal plate is changed to a conveyance speed which is different from the target line speed or a temperature of the metal plate falls out of a predetermined range, after the second input unit receives the command to execute the furnace temperature change.

With the above configuration (9), since the temperature change of the heat-treatment furnace is stopped when an abnormality, such as the line speed or the strip temperature becomes a value out of the predetermined range, is detected in the heat-treatment furnace, it is possible to suppress a failure of the components for the heat-treatment furnace caused by an abnormal event, for example.

(10) In some embodiments, in any one of the above configuration (6) to (9), the operation support apparatus further includes a fourth output unit configured to output a notice that execution of the furnace temperature change is stopped, when the temperature of the heat-treatment furnace is restored to the current furnace temperature.

With the above configuration (10), since, when the temperature change of the heat-treatment furnace is stopped, the notice of this is output to the output device or the like via the fourth output unit, the operator can appropriately know that the furnace temperature change is stopped. Thus, it is possible to further improve operator convenience.

(11) In some embodiments, in any one of the above configuration (1) to (10), the operation support apparatus further includes a fourth input unit for receiving a command of whether to execute a line speed change from the current line speed to the target line speed, and a line speed setting unit configured to transmit, to a line speed control unit for controlling the conveyance speed of the metal plate, a line speed change command to change the conveyance speed to the target line speed, when the fourth input unit receives the command to execute the line speed change.

With the above configuration (11), since the above-described fourth input unit and line speed setting unit are provided, it is possible to receive, by the fourth input unit, the command related to the necessity of execution of the line speed change input by the operator with the input device and it is possible to transmit the line speed change command according to the operator's request from the line speed setting unit to the line speed control unit, for example. Thus, it is possible to appropriately transmit the command to change the line speed from the operator to the line speed control unit, and to appropriately change the line speed of the heat-treatment furnace.

(12) In some embodiments, in any one of the above configurations (1) to (11), the required time calculation unit is configured to calculate a strip temperature of the metal plate at the target furnace temperature, correct the target line speed such that the strip temperature falls within a predetermined range, and calculate, as the estimated required time, a time that elapses until the temperature of the heat-treatment furnace reaches, from the current furnace temperature, a corrected target furnace temperature corresponding to the corrected target line speed.

With the above configuration (12), since, based on the calculation result of the strip temperature at the target furnace temperature, the target line speed is corrected such that the strip temperature falls within the predetermined range, and the time until the temperature of the heat-treatment furnace reaches the corrected target furnace temperature corresponding to the corrected target line is calculated as the estimated required time, the strip temperature after the start of the furnace temperature change easily falls within the predetermined range. Thus, it is possible to heat-treat the metal plate at an appropriate temperature within the predetermined range, even if the furnace temperature and the line speed are changed, facilitating maintenance of quality of the metal plate product.

(13) A heat-treatment facility for a metal plate according to at least one embodiment of the present invention includes a heat-treatment furnace for heat-treating a metal plate continuously, and the operation support apparatus according to any one of the above configurations (1) to (12).

In the above configuration (13), since the estimated required time for the temperature of the heat-treatment furnace to reach, from the current furnace temperature, the target furnace temperature corresponding to the target line speed to be changed is calculated and output to an output device (such as a display or a loudspeaker), when the conveyance speed (line speed) of the metal plate is to be changed in the heat-treatment furnace, the operator can determine, based on the output result (estimated required time), whether the changes of the furnace temperature and the line speed are necessary.

Thus, for example, even if there is a request to change the line speed, the operator may be able to determine not to change the furnace temperature and the line speed, in view of other circumstances (such as an operating hour and the like of the heat-treatment furnace), in a case where the estimated required time, which is the above-described output result, exceeds an allowable range.

Thus, with the above configuration (13), since the operator can determine, based on the outputted estimated required time, whether to actually change the furnace temperature and the line speed, it is possible to improve operator convenience.

(14) An operation support method for a heat-treatment furnace according to at least one embodiment of the present invention is an operation support method for a heat-treatment furnace for heat-treating a metal plate continuously, the method including a step of calculating, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the heat-treatment furnace corresponding to the target line speed, and a step of outputting the estimated required time calculated in the calculation step.

In the above method (14), since the estimated required time for the temperature of the heat-treatment furnace to reach, from the current furnace temperature, the target furnace temperature corresponding to the target line speed to be changed is calculated and output to an output device (such as a display or a loudspeaker), when the conveyance speed (line speed) of the metal plate is to be changed in the heat-treatment furnace, the operator can determine, based on the output result (estimated required time), whether the changes of the furnace temperature and the line speed are necessary.

Thus, for example, even if there is a request to change the line speed, the operator may be able to determine not to change the furnace temperature and the line speed, in view of other circumstances (such as an operating hour and the like of the heat-treatment furnace), in a case where the estimated required time, which is the above-described output result, exceeds an allowable range.

Thus, with the above method (14), since the operator can determine, based on the outputted estimated required time, whether to actually change the furnace temperature and the line speed, it is possible to improve operator convenience.

(15) An operation support method for a heat-treatment facility according to at least one embodiment of the present invention is an operation support method for a heat-treatment facility for a metal plate including a heat-treatment furnace for heat-treating the metal plate continuously, the method including a step of performing the operation support method according to the above method (14) on the heat-treatment furnace, a step of receiving a command of whether to execute a furnace temperature change from the current furnace temperature to the target furnace temperature, and a step of changing the temperature of the heat-treatment furnace to the target furnace temperature, when the command to execute the furnace temperature change is received in the step of receiving the command.

In the above method (15), since the estimated required time for the temperature of the heat-treatment furnace to reach, from the current furnace temperature, the target furnace temperature corresponding to the target line speed to be changed is calculated and output to an output device (such as a display or a loudspeaker), when the conveyance speed (line speed) of the metal plate is to be changed in the heat-treatment furnace, the operator can determine, based on the output result (estimated required time), whether the changes of the furnace temperature and the line speed are necessary.

Thus, for example, even if there is a request to change the line speed, the operator may be able to determine not to change the furnace temperature and the line speed, in view of other circumstances (such as an operating hour and the like of the heat-treatment furnace), in a case where the estimated required time, which is the above-described output result, exceeds an allowable range.

Thus, with the above method (14), since the operator can determine, based on the outputted estimated required time, whether to actually change the furnace temperature and the line speed, it is possible to improve operator convenience.

Embodiments of the present invention were described above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Continuous annealing furnace
2 Metal plate
4 Preheating zone
6 Heating zone
8 Cooling zone
9 Cooling nozzle
10 Conveyance roll
20 Operation support apparatus
22 CPU
24 Memory
26 I/O interface
28 Communication interface
30 Input unit
30a First input unit
30b Second input unit
30c Third input unit
30d Fourth input unit
32 Output unit
32a First output unit
32b Second output unit
32c Third output unit
32d Fourth output unit
34 Measurement data acquisition unit
34a Furnace temperature acquisition unit
34b Strip temperature acquisition unit
34c Line speed acquisition unit
35 Target furnace temperature calculation unit
36 Required time calculation unit
38 Furnace temperature setting unit
40 Line speed setting unit
42 Furnace temperature control unit
44 Line speed control unit
46 Furnace temperature measurement unit
48 Strip temperature measurement unit
50 Line speed measurement unit
60 Operator terminal
62 Input device
64 Output device
70 Input box
74 Calculation start button
76 Run button
78 Cancel button
80 Furnace temperature change stop button
81 Notice of readiness
82 Run button
83 Error
84 Cancel button
102 Furnace temperature set value
104 Calculated value
106 Calculated value
108 Set value

The invention claimed is:

1. An operation support apparatus for a heat-treatment furnace for heat-treating a metal plate continuously, the apparatus comprising:
a required time calculator configured to calculate, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the heat-treatment furnace corresponding to the target line speed;
a first output controller configured to output the estimated required time calculated by the required time calculator to an output terminal;
a second input unit for receiving a command of whether to execute a furnace temperature change from the current furnace temperature to the target furnace temperature; and
a furnace temperature setting unit configured to transmit, to a furnace temperature control unit for controlling the temperature of the heat-treatment furnace, a furnace temperature change command to change the temperature of the heat-treatment furnace to the target furnace temperature, when the second input unit receives the command to execute the furnace temperature change, and
wherein the furnace temperature setting unit is configured to restore the temperature of the heat-treatment furnace to the current furnace temperature before the furnace temperature change, if a change from the current line speed to the target line speed is not executed within a predetermined time limit, after a notice of readiness to change the conveyance speed is output.

2. The operation support apparatus for the heat-treatment furnace according to claim 1, further comprising a first input unit for receiving an input of the target line speed.

3. The operation support apparatus for the heat-treatment furnace according to claim 1, further comprising a second output controller configured to output the notice of readiness to change the conveyance speed of the metal plate to the target line speed, when a difference between the temperature of the heat-treatment furnace and the target furnace temperature falls within a predetermined range, after the furnace temperature setting unit transmits the furnace temperature change command to the furnace temperature control unit.

4. The operation support apparatus for the heat-treatment furnace according to claim 3, further comprising a third output controller configured to output an error between the estimated required time and a time from when the furnace temperature change command is transmitted until when the difference between the temperature of the heat-treatment furnace and the target furnace temperature falls in the predetermined range.

5. The operation support apparatus for the heat-treatment furnace according to claim 1, further comprising a line speed acquisition unit for acquiring time-series data of the conveyance speed of the metal plate,
wherein the furnace temperature setting unit is configured to determine, based on the time-series data of the conveyance speed, presence or absence of the change from the current line speed to the target line speed.

6. The operation support apparatus for the heat-treatment furnace according to claim 1, further comprising a third input unit for receiving a command to stop executing the furnace temperature change,
wherein the furnace temperature setting unit is configured to restore the temperature of the heat-treatment furnace to the current furnace temperature, when the third input unit receives the command to stop, after the second input unit receives the command to execute the furnace temperature change.

7. The operation support apparatus for the heat-treatment furnace according to claim 1,
wherein the furnace temperature setting unit is configured to restore the temperature of the heat-treatment furnace to the current furnace temperature, if it is detected that the conveyance speed of the metal plate is changed to a conveyance speed which is different from the target line speed or a temperature of the metal plate falls out of a predetermined range, after the second input unit receives the command to execute the furnace temperature change.

8. The operation support apparatus for the heat-treatment furnace according to claim 1, further comprising a fourth output controller configured to output a notice that execution of the furnace temperature change is stopped, when the temperature of the heat-treatment furnace is restored to the current furnace temperature.

9. The operation support apparatus for the heat-treatment furnace according to claim 1, further comprising:
a fourth input unit for receiving a command of whether to execute a line speed change from the current line speed to the target line speed; and
a line speed setting unit configured to transmit, to a line speed control unit for controlling the conveyance speed of the metal plate, a line speed change command to change the conveyance speed to the target line speed, when the fourth input unit receives the command to execute the line speed change.

10. The operation support apparatus for the heat-treatment furnace according to claim 1,
wherein the required time calculator is configured to:
calculate a strip temperature of the metal plate at the target furnace temperature;
correct the target line speed such that the strip temperature falls within a predetermined range; and
calculate, as the estimated required time, a time that elapses until the temperature of the heat-treatment furnace reaches, from the current furnace temperature, a corrected target furnace temperature corresponding to the corrected target line speed.

11. A heat-treatment facility, comprising:
a heat-treatment furnace for heat-treating a metal plate continuously; and
the operation support apparatus according to claim 1.

12. An operation support method for a heat-treatment furnace for heat-treating a metal plate continuously, the method comprising:
a step of calculating, based on a current furnace temperature which is a current temperature of the heat-treatment furnace, a current line speed which is a current conveyance speed of the metal plate, and a target line speed which is a conveyance speed of the metal plate to be changed from the current line speed, an estimated required time until a temperature of the heat-treatment furnace reaches, from the current furnace temperature, a target furnace temperature which is a temperature of the heat-treatment furnace corresponding to the target line speed;
a step of outputting the estimated required time calculated in the calculation step to an output terminal;
a step of for receiving a command of whether to execute a furnace temperature change from the current furnace temperature to the target furnace temperature; and
a step of changing the temperature of the heat-treatment furnace to the target furnace temperature, when the command to execute the furnace temperature change is received in the step of receiving the command,
wherein the temperature of the heat-treatment furnace is restored to the current furnace temperature before the furnace temperature change, if a change from the current line speed to the target line speed is not executed within a predetermined time limit, after a notice of readiness to change the conveyance speed is output.

* * * * *